United States Patent
Ronzi et al.

(10) Patent No.: US 9,522,619 B2
(45) Date of Patent: Dec. 20, 2016

(54) HEADREST ADJUSTMENT MECHANISM FOR VEHICLE SEATS

(71) Applicants: Toyota Boshoku America, Inc., Novi, MI (US); Gen-X Engineering Solution, Inc., Wixom, MI (US)

(72) Inventors: Brett Ronzi, Highland, MI (US); Troy Allen Isaacson, Novi, MI (US)

(73) Assignees: Toyota Boshoku America, Inc., Novi, MI (US); Gen-X Engineering Solution, Inc., Wixom, MI (US)

( * ) Notice: Subject to any disclaimer, the term of this patent is extended or adjusted under 35 U.S.C. 154(b) by 0 days.

(21) Appl. No.: 14/882,729

(22) Filed: Oct. 14, 2015

(65) Prior Publication Data
US 2016/0031347 A1 Feb. 4, 2016

Related U.S. Application Data

(63) Continuation of application No. 13/948,215, filed on Jul. 23, 2013, now Pat. No. 9,187,017.
(Continued)

(51) Int. Cl.
*B60N 2/48* (2006.01)

(52) U.S. Cl.
CPC .......... *B60N 2/4811* (2013.01); *B60N 2/4814* (2013.01); *B60N 2/4817* (2013.01); *B60N 2002/4897* (2013.01)

(58) Field of Classification Search
CPC ............... B60N 2/4817; B60N 2/4814; B60N 2002/7897; B60N 2/4811
(Continued)

(56) References Cited

U.S. PATENT DOCUMENTS

| | | | | |
|---|---|---|---|---|
| 4,854,642 A | * | 8/1989 | Vidwans | B60N 2/4817 297/391 |
| 5,080,437 A | * | 1/1992 | Pesta | B60N 2/4817 248/408 |

(Continued)

FOREIGN PATENT DOCUMENTS

| | | |
|---|---|---|
| CN | 201961194 | 9/2011 |
| DE | 19631100 | 2/1998 |

(Continued)

OTHER PUBLICATIONS

International Search Report and Written Opinion for PCT Application No. PCT/US2013/051554 mailed on Dec. 13, 2013.
(Continued)

*Primary Examiner* — Ryan Kwiecinski
(74) *Attorney, Agent, or Firm* — Carlson, Gaskey & Olds, P.C.

(57) ABSTRACT

A bushing allows for adjustability of a position of a headrest. The bushing includes a head portion having an opening and a passageway opening. The bushing also includes a body portion defining an internal passageway. The passageway opening of the head portion is aligned with the internal passageway of the body portion. The body portion includes a wall surrounding an area of reduced thickness, and a protrusion is located on an internal surface of the area of reduced thickness. The bushing also includes a moveable portion received in the opening of the head portion. The moveable portion is moveable between a first position where a feature engages a notch of a post receivable in the internal passageway of the body portion and the passageway opening of the head portion to retain the headrest in a position and a second position where the feature is disengaged from the notch of the post, allowing the post and the headrest to move relative to the bushing.

24 Claims, 5 Drawing Sheets

Related U.S. Application Data

(60) Provisional application No. 61/675,048, filed on Jul. 24, 2012.

(58) Field of Classification Search
USPC .............................................. 297/410
See application file for complete search history.

(56) References Cited

U.S. PATENT DOCUMENTS

| | | | |
|---|---|---|---|
| 5,667,276 A * | 9/1997 | Connelly | B60N 2/4814 |
| | | | 297/391 |
| 5,738,413 A | 4/1998 | De Filippo | |
| 5,788,250 A * | 8/1998 | Masters | B60N 2/4826 |
| | | | 297/391 |
| 5,816,658 A | 10/1998 | Wallis | |
| 5,823,623 A | 10/1998 | Beck | |
| 5,860,703 A * | 1/1999 | Courtois | B60N 2/4817 |
| | | | 297/404 |
| 5,992,939 A * | 11/1999 | Gass | B60N 2/4808 |
| | | | 297/410 |
| 6,012,777 A | 1/2000 | Wege et al. | |
| 6,099,077 A * | 8/2000 | Isaacson | B60N 2/4814 |
| | | | 297/410 |
| 6,454,356 B1 * | 9/2002 | Yamada | B60N 2/4814 |
| | | | 297/391 |
| 6,572,186 B1 | 6/2003 | Fischer et al. | |
| 6,742,846 B1 | 6/2004 | Isaacson | |
| 6,802,565 B2 | 10/2004 | Isaacson | |
| 6,969,118 B2 | 11/2005 | Yamada | |
| 7,370,915 B2 | 5/2008 | Droche | |
| 7,434,886 B2 | 10/2008 | Yamada | |
| 7,600,818 B2 | 10/2009 | Ebbeskotte et al. | |
| 8,376,465 B2 | 2/2013 | Veine et al. | |
| 2003/0222491 A1 * | 12/2003 | Isaacson | B60N 2/4814 |
| | | | 297/410 |
| 2004/0090103 A1 * | 5/2004 | Yamada | B21C 37/065 |
| | | | 297/391 |
| 2005/0012374 A1 * | 1/2005 | Isaacson | B60N 2/4814 |
| | | | 297/410 |
| 2005/0077772 A1 * | 4/2005 | Yamada | B60N 2/4814 |
| | | | 297/410 |
| 2006/0163929 A1 * | 7/2006 | Ebbeskotte | B60N 2/4814 |
| | | | 297/408 |
| 2006/0163931 A1 * | 7/2006 | Yamada | B60N 2/4817 |
| | | | 297/410 |
| 2008/0303334 A1 | 12/2008 | Dillinger | |
| 2009/0140560 A1 | 6/2009 | Yamada | |
| 2012/0007403 A1 | 1/2012 | Menges et al. | |

FOREIGN PATENT DOCUMENTS

| | | |
|---|---|---|
| EP | 0283863 A1 | 3/1988 |
| EP | 0307214 A2 | 3/1989 |
| JP | 60-60309 | 6/1985 |
| JP | 63-146549 | 9/1988 |
| JP | 63-146550 | 9/1988 |
| JP | 6-46551 | 6/1994 |
| JP | 8-84634 | 4/1996 |

OTHER PUBLICATIONS

International Preliminary Report on Patentability for PCT Application No. PCT/US2013/051554 mailed on Nov. 5, 2014.

* cited by examiner

HEADREST ADJUSTMENT MECHANISM FOR VEHICLE SEATS

REFERENCE TO RELATED APPLICATIONS

This application is a continuation of U.S. application Ser. No. 13/948,215 filed on Jul. 23, 2013, now U.S. Pat. No. 9,187,017 issued on Nov. 17, 2015, which claims priority to U.S. Provisional Application No. 61/675,048 filed on Jul. 24, 2012.

BACKGROUND OF THE INVENTION

A vehicle seat can include an adjustable headrest mounted to a backrest of the vehicle seat. The headrest can be moved in a generally vertical direction relative to the seat. Two posts are mounted to the headrest. Two guide sleeves are located within the backrest of the vehicle seat, and a bushing is received in each of the two guide sleeves. Each post is receivable in one of the two guide sleeves.

Each post includes a plurality of notches. One bushing includes a mechanism that is received in one of the notches, securing the post and the attached headrest in a position. When the headrest is to be moved to another position relative to the backrest of the vehicle seat, the mechanism of the bushing is removed from the notch of the post, allowing the post, and therefore the attached headrest, to slide in the generally vertical direction relative to the backrest of the vehicle seat to a desired position. Once the headrest is in the desired position, the mechanism is released to allow the mechanism to engage another notch of the post, securing the headrest in the desired position.

SUMMARY OF THE INVENTION

A bushing allows for adjustability of a position of a headrest. The bushing includes a head portion having an opening and a passageway opening. The bushing also includes a body portion defining an internal passageway. The passageway opening of the head portion is aligned with the internal passageway of the body portion. The body portion includes a wall surrounding an area of reduced thickness, and a protrusion is located on an internal surface of the area of reduced thickness. The bushing also includes a moveable portion received in the opening of the head portion. The moveable portion is moveable between a first position where a feature engages a notch of a post receivable in the internal passageway of the body portion and the passageway opening of the head portion to retain the headrest in a position and a second position where the feature is disengaged from the notch of the post, allowing the post and the headrest to move relative to the bushing.

A headrest assembly includes a headrest, two posts secured to the headrest, where at least one of the two posts includes a plurality of notches, and a bushing to allow adjustability of a position of the headrest. The bushing includes a head portion having an opening and a passageway opening. The bushing also includes a body portion defining an internal passageway, where the passageway opening of the head portion is aligned with the internal passageway of the body portion. The body portion includes a wall surrounding two areas having a reduced thickness on opposing sides of the body portion, and a protrusion is located on an internal surface of each of the two areas of reduced thickness. A first distance is defined between the internal surfaces of the two areas of reduced thickness, a second distance is defined between the two projections, and the second distance is less than the first distance. One of the two posts with the plurality of notches is received in the internal passageway of the body portion and the passageway opening of the head portion of the bushing and has a third diameter that is greater than the second distance defined between the two projections. The bushing also includes a moveable portion received in the opening of the head portion. The moveable portion is moveable between a first position where a feature engages one of the plurality of notches of the post receivable in the internal passageway of the body portion and the passageway opening of the head portion of the bushing to retain the headrest in a position and a second position where the feature is disengaged from the one of the plurality of notches of the post, allowing the post and the headrest to move relative to the bushing.

These and other features of the present invention can be best understood from the following specification and drawings, the following of which is a brief description.

DETAILED DESCRIPTION OF THE PREFERRED EMBODIMENTS

Figure 1:
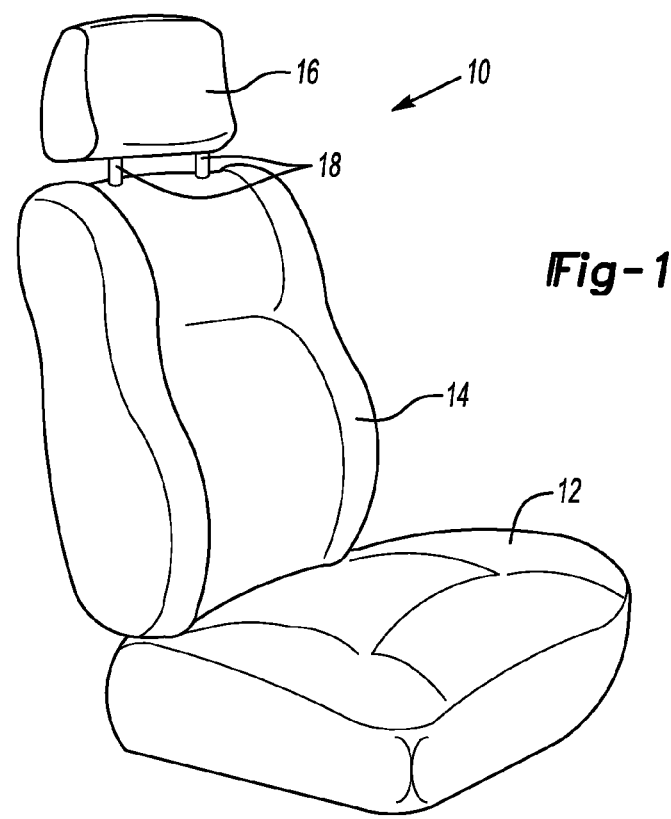
FIG. 1 illustrates a perspective view of a vehicle seat and a headrest adjustment mechanism.

FIG. 1 illustrates a vehicle seat 10 includes a seat 12 and a backrest 14. The vehicle seat 10 includes a headrest 16 that is movable in a generally vertical direction (along an axis Z) relative to the backrest 14. At least one post 18 is secured to the headrest 16. In one example, the vehicle seat 10 includes two posts 18. One of the posts 18 includes a plurality of notches 42, as explained below. The post 18 has a diameter C.

Figure 2:
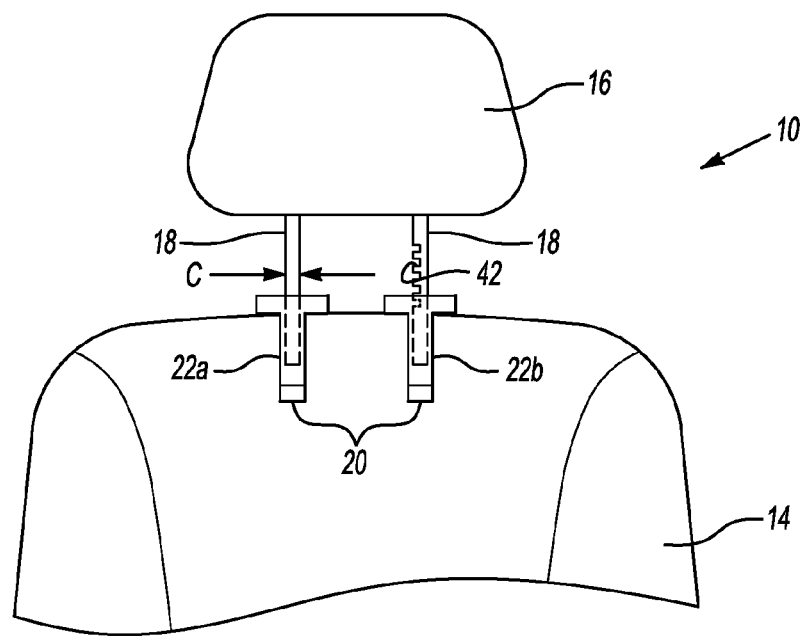
FIG. 2 illustrates a view of a top portion of a backrest of a vehicle seat, the headrest, and an adjustment mechanism.

FIG. 2 illustrates a top portion of the backrest 14 of the vehicle seat 10. A guide sleeve 20 corresponding to each post 18 is received within the backrest 14. In one example, the guide sleeve 20 is made of metal. In one example, there are two guide sleeves 20. A bushing 22a and 22b is received in each of the guide sleeves 20. In one example, the bushing 22a is a master bushing, and the bushing 22b is a slave bushing. That is, the master bushing is actuated to allow movement of the headrest 16 relative to the backrest 14 of the vehicle seat 10. As explained below, a mechanism of the bushing 22a is manually actuated to allow the post 18, and therefore the headrest 16, to move relative to the backrest 14.

Figure 3:
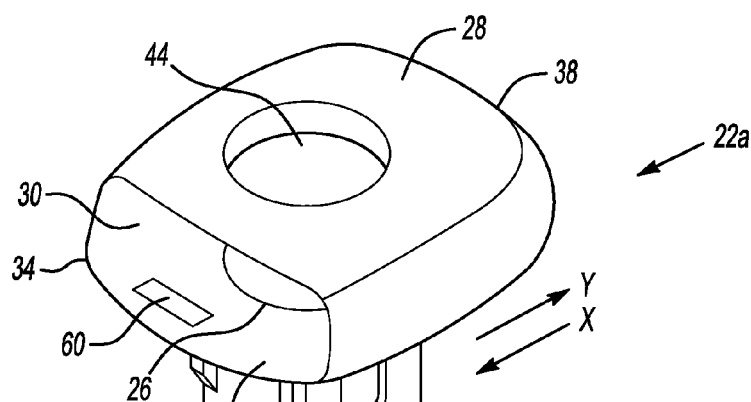
FIG. 3 illustrates a perspective view of a bushing.

FIG. 3 illustrates the bushing 22a. In one example, the bushing 22a is made of molded plastic. The bushing 22a includes a body portion 24 that is received inside one of the guide sleeves 20. The body portion 24 includes an internal passageway 26 that extends along the axis Z. The body portion 24 also includes a resilient feature 40 that is received in an opening (not shown) in the guide sleeve 20. When the body portion 24 is inserted into the guide sleeve 20, the resilient feature 40 is compressed inwardly to allow the body portion 24 to slide within to the guide sleeve 20. However, once the resilient feature 40 is aligned with the opening, the resilient feature 40 is biased outwardly into the opening to retain the body portion 24 within the guide sleeve 20.

The bushing 22a also includes a head portion 28 that defines a space 30 accessible through an opening 32 on a first side 34 of the head portion 28. The head portion 28 also includes a wall 36 (shown in FIG. 4) on a second side 38 of the head portion 28. The head portion 28 also includes passageway opening 44 aligned with the internal passageway 26 of the body portion 24. In one example, the body portion 24 and the head portion 28 are integrally formed into a single component.

Figure 4:
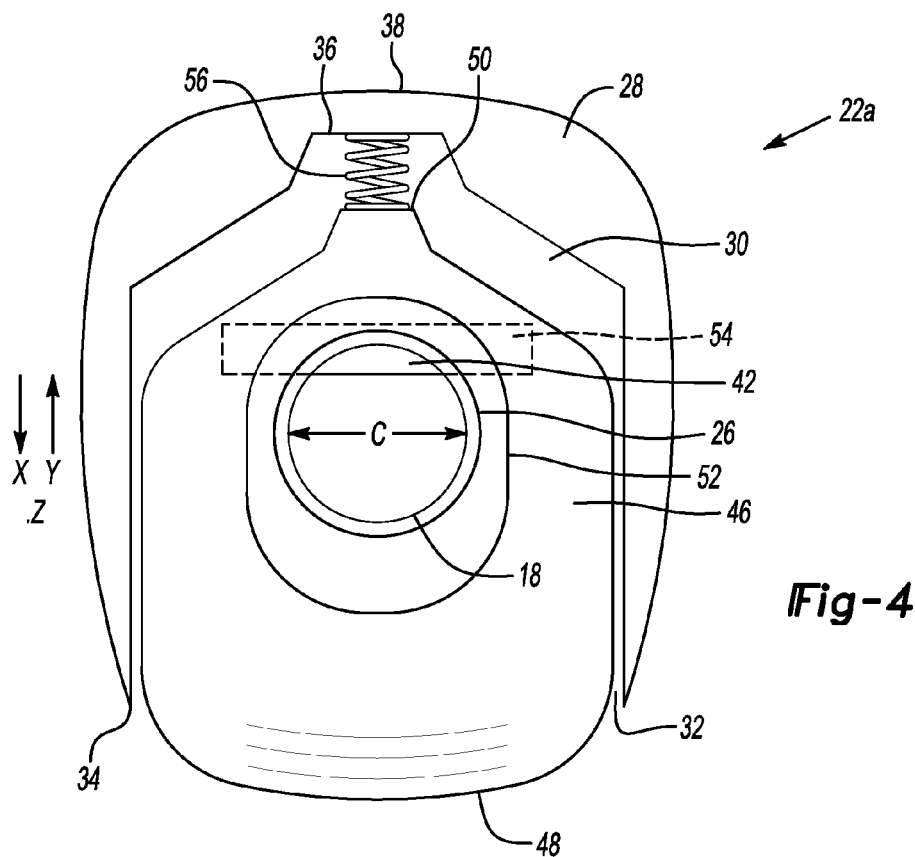
FIG. 4 illustrates a cross sectional view of a moveable portion received within an opening of a head portion of the bushing when a metal piece engages a notch in a post to retain the headrest in a first position.
Figure 5:
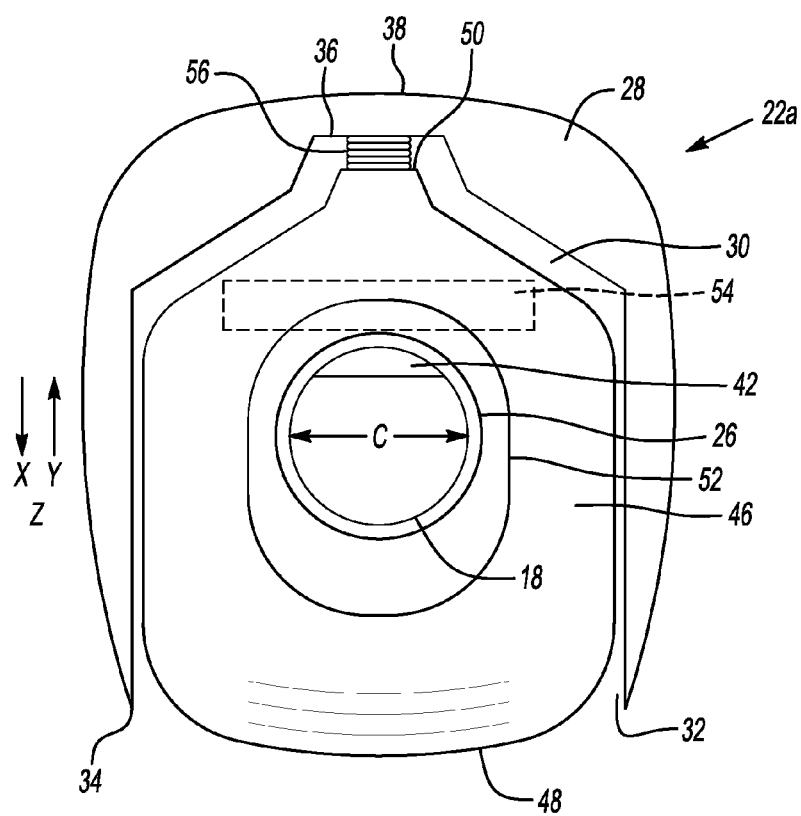
FIG. 5 illustrates a cross sectional view of the moveable portion received within the opening of the head portion of the bushing when the metal piece does not engage the notch in the post to allow the post and the headrest to move relative to the backrest.

FIGS. 4 and 5 illustrate a moveable portion 46 received in the space 30 of the head portion 28. In one example, the head portion 28 is formed of molded plastic. The moveable portion 46 includes a manual contact surface 48, an opposing spring surface 50 and a passage 52 that is alignable with the passageway 26 of the body portion 24 and the passageway openings 44 of the head portion 28. A metal piece 54, such as a steel sheet, is molded into or snap fit in the moveable portion 46. In one example, the metal piece 54 is a metal plate. A resilient member 56 is located between the wall 36 of the head portion 28 and the spring surface 50 of the moveable portion 46. In one example, the resilient member 56 is a coil spring. The metal piece 54 and the resilient spring 56 are two separate components that are non-integral.

As shown in FIG. 4, when the moveable portion 46 is in a first position, the resilient member 56 biases the moveable portion 46 in a direction X to a first position such that a portion of the metal piece 54 is received within a notch 42 of the post 18 that is received in the passageway openings 44 of the head portion 28, the passage 52 of the moveable portion 46, and the passageway 26 of the body portion 24. Engagement of the metal piece 54 in the notch 42 of the post 18 secures the post 18, and therefore the headrest 16, in a position.

As shown in FIG. 5, when pressure is applied on the manual contact surface 48 of the moveable portion 46 (for example, by a finger of a person), the moveable portion 46 moves in the direction Y to a second position and compresses the resilient member 56. When the moveable portion 46 is in the second position, the metal piece 54 is not received in a notch 42 in the post 18, allowing the post 18, and therefore the headrest 16, to move axially along the axis Z relative to the backrest 14 and the bushing 22a.

When the pressure is released from the manual contact surface 48 of the moveable portion 46, the resilient member 56 biases the moveable portion 46 back to the first position, as shown in FIG. 4. The metal piece 54 engages another notch 42 of the post 18, securing the post 18, and therefore the headrest 16, in another position.

Figure 6:
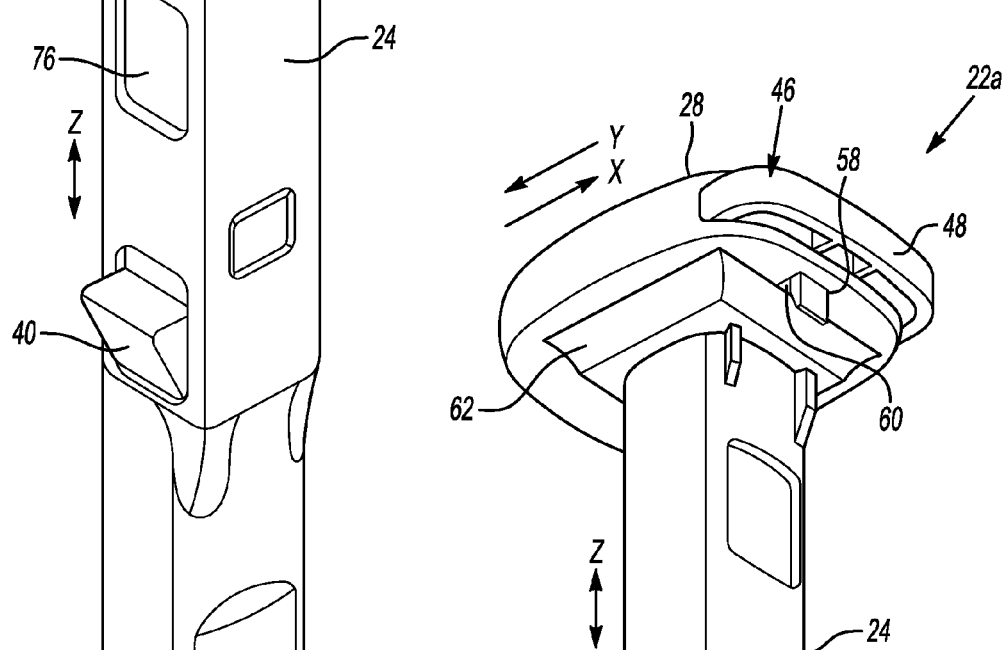
FIG. 6 illustrates another perspective view of the bushing.
Figure 7:
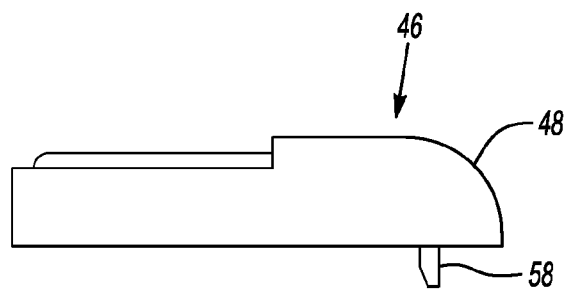
FIG. 7 illustrates a side view of the moveable portion.
Figure 8:
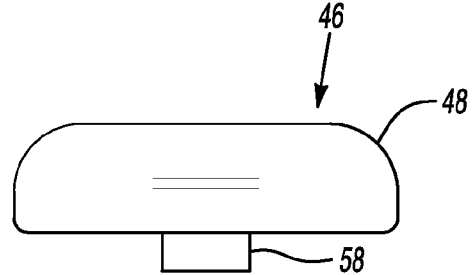
FIG. 8 illustrates a front view of the moveable portion.

As shown in FIG. 6, the moveable portion 46 includes a flexible projection 58 (shown in FIGS. 7 and 8) that is received in an opening 60 in the head portion 28 when the moveable portion 46 is received in the space 30 of the head portion 28. The flexible projection 58 retains the moveable portion 46 within the opening 60 of the head portion 28. As the moveable portion 46 moves between the first position and the second position, the flexible projection 58 moves within the opening 60 of the head portion 28 to removeably retain the moveable portion 46 inside the head portion 28.

Figure 9:
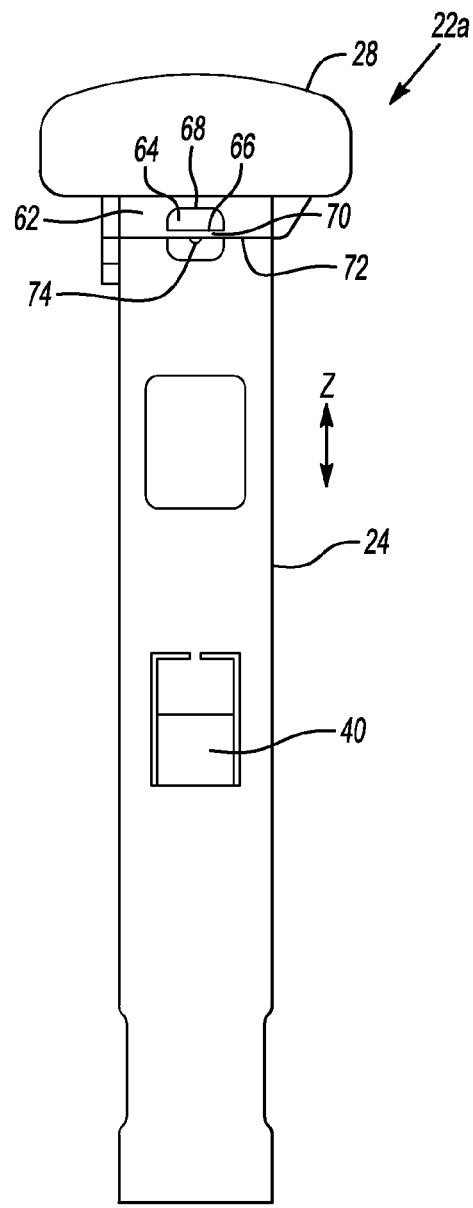
FIG. 9 illustrates a front view of the bushing.

As shown in FIG. 9, the bushing 22a also includes a collar 62 located between the body portion 24 and the head portion 28. The collar 62 includes an opening 64 having a flat bottom surface 66 and a curved upper surface 68. A flexible wall 70 is defined between the flat bottom surface 66 of the opening 64 and a lower surface 72 of the collar 62. A rib 74 projects from the lower surface 72 of the collar 62 (FIG. 2). When the bushing 22a is positioned in the guide sleeve 20, the flexible wall 70 and the rib 74 are deformable and contact an upper surface of the guide sleeve 20 to absorb impact.

Figure 10:
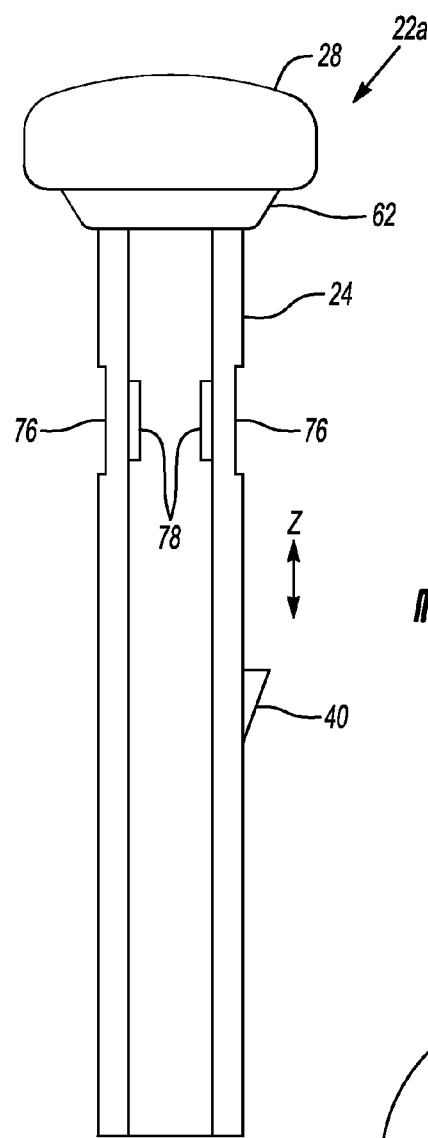
FIG. 10 illustrates a cross-sectional view of the body portion of the bushing including areas having a reduced thickness and projections on the internal surface of the areas having a reduced thickness.
Figure 11:
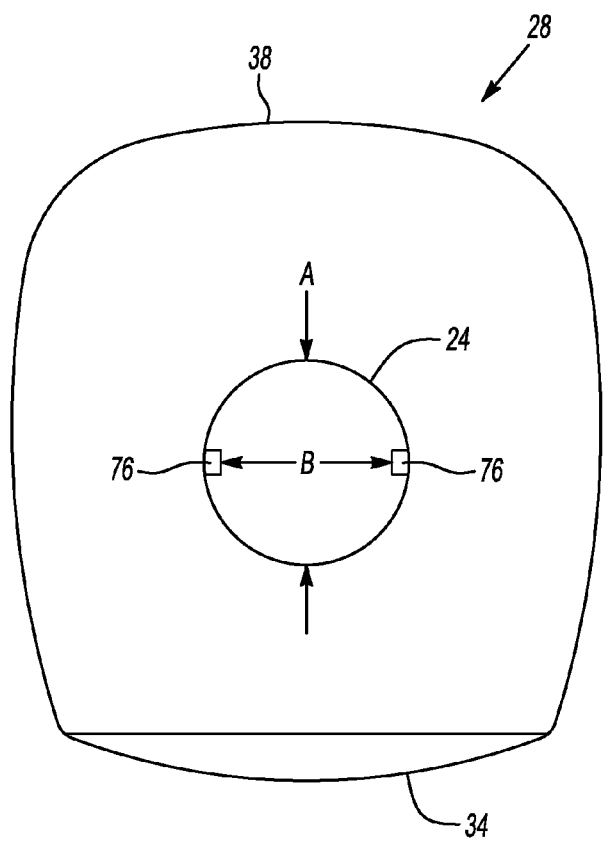
FIG. 11 illustrates a top view of the bushing showing the projections on the internal surface of the areas having a reduced thickness.

As shown in FIG. 10, the body portion 24 includes an area 76 having a reduced wall thickness. That is, a thickness of the area 76 is less than a thickness of the surrounding wall of the body portion 24 of the bushing 22. In one example, the area 76 is substantially rectangular. In one example, the area 76 is recessed from an external side of the body portion 24. That is, an inner surface of the body portion 24 does not include any recessed portion as part of the area 76 and is substantially smooth in this area. In one example, the body portion 24 includes two areas 76 on opposing sides of the body portion 24. The area 76 is continuous with the surrounding wall of the body portion 24, and there are no spaces or gaps between the area 76 and the surrounding wall of the body portion 24. In one example, the area 76 is located between the collar 62 and the resilient feature 40. As the area 76 has a thickness less than the thickness of the surrounding material of the body portion 24, it is more flexible.

The body portion 24 includes an elongated rib 78 located on an inner surface of the passageway 26 of the body portion 24 and aligned with the area 76 having a reduced wall thickness. The elongated rib 78 extends along the X axis. In one example, there are two elongated ribs 78 each aligned with one of the two areas 76 of reduced wall thickness. In one example, each elongated rib 78 is located across from the other elongated rib 78. A diameter of the passageway 26 of the body portion 24 has a diameter A, and a distance between the two elongated ribs 78 is a distance B. The distance B is less than the distance A. Additionally, the diameter C of the post 18 is slightly greater than the distance B between the elongated ribs 78.

When the post 18 is received in the passageway 26 of the body portion 24 of the bushing 22a, the larger diameter post 18 presses on the elongated ribs 78 as the distance B between the elongated ribs 78 is less than the diameter C of the post 18. As the area 76 has a reduced wall thickness, the area 76 can flex when the larger diameter post 18 is located between the smaller distance elongated ribs 78. As the post 18 is moved within the passageway 26 of the body portion 24, the post 18 continues to press on the elongated ribs 78, providing friction which allows for better control of the movement of the post 18 when the post 18 is being moved to adjust a location of the headrest 16. The contact also decreases buzz, squeak and rattle of the mechanism.

When the headrest 16 is to be moved along the Z axis to another position, the manual contact surface 48 of the moveable portion 46 is pressed, removing the metal piece 54 from one of the notches 42 in the post 18. This allows the post 18, and the attached headrest 18, to move to a desired position along the axis Z. Once the headrest 16 is in the desired position, the manual contact surface 48 is released, and the resilient member 56 biases the moveable portion 46 into another notch 42 of the post 18, securing the headrest 16 in a new position.

The foregoing description is only exemplary of the principles of the invention. Many modifications and variations are possible in light of the above teachings, for instance, the inlet vanes may also have intermediate positions. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A bushing to allow adjustability of a position of a headrest, the bushing comprising:
   a head portion having an opening and a passageway opening;
   a body portion defining an internal passageway, the body portion including a collar including a flexible wall, a collar opening located above the flexible wall, a rib on a lower surface of the flexible wall, wherein the flexible wall is deformable to absorb impacts, wherein the passageway opening of the head portion is aligned with the internal passageway of the body portion, wherein the flexible wall has a first width and the rib has a second width, and the first width is greater than the second width; and
   a moveable portion received in the opening of the head portion, wherein the moveable portion is moveable between a first position wherein a feature engages a notch of a post receivable in the internal passageway of the body portion and the passageway opening of the head portion to retain the headrest in a position, and a second position wherein the feature is disengaged from the notch of the post, allowing the post and the headrest to move relative to the bushing.

2. The bushing as recited in claim 1 wherein the head portion and the body portion are integral and made of molded plastic.

3. The bushing as recited in claim 1 wherein the head portion includes a first side and a second side, wherein the opening is located at the first side and a wall is located near the second side.

4. The bushing as recited in claim 1 wherein the head portion includes an aperture and the moveable portion includes a projection that is received in the aperture to removeably retain the moveable portion in the head portion as the moveable portion moves relative to the head portion.

5. The bushing as recited in claim 1 wherein the two protrusions are elongated and extend along a longitudinal axis of the internal passage.

6. The bushing as recited in claim 1 wherein the body portion includes a wall surrounding an area of reduced thickness, and a protrusion is located on an internal surface of the area of reduced thickness.

7. The bushing as recited in claim 1 wherein the collar opening includes a flat surface.

8. The bushing as recited in claim 1 wherein the body portion includes a body, and the collar is located between the head portion and the body of the body portion.

9. The bushing as recited in claim 1 wherein the rib is entirely located on the lower surface of the flexible wall.

10. The bushing as recited in claim 1 wherein the wall is planar and flexible in a direction substantially parallel to a longitudinal axis of the internal passage.

11. The bushing as recited in claim 1 wherein the wall is planar and substantially perpendicular to a longitudinal axis of the internal passage.

12. The bushing as recited in claim 1 wherein the opening is accessible in a direction that is substantially perpendicular to a longitudinal axis of the internal passage.

13. A bushing to allow adjustability of a position of a headrest, the bushing comprising:
    a head portion having an opening and a passageway opening;
    a body portion defining an internal passageway, the body portion including a collar including a flexible wall, a collar opening located above the flexible wall, a rib on a lower surface of the flexible wall, wherein the flexible wall is deformable to absorb impacts, wherein the passageway opening of the head portion is aligned with the internal passageway of the body portion, wherein the body portion includes two areas of reduced thickness and two protrusions, wherein one of the two areas of reduced thickness and one of the two protrusions and the other of the two areas of reduced thickness and other of the two protrusions are located across from each other, a first distance is defined between the internal surfaces of the two areas of reduced thickness, a second distance is defined between the two projections, and the second distance is less than the first distance; and
    a moveable portion received in the opening of the head portion, wherein the moveable portion is moveable between a first position wherein a feature engages a notch of a post receivable in the internal passageway of the body portion and the passageway opening of the head portion to retain the headrest in a position, and a second position wherein the feature is disengaged from the notch of the post, allowing the post and the headrest to move relative to the bushing.

14. A bushing to allow adjustability of a position of a headrest, the bushing comprising:
    a head portion having an opening and a passageway opening, wherein the head portion includes a first side and a second side, wherein the opening is located at the first side and a wall is located near the second side;
    a body portion defining an internal passageway, the body portion including a collar including a flexible wall, a collar opening located above the flexible wall, a rib on a lower surface of the flexible wall, wherein the flexible wall is deformable to absorb impacts, wherein the passageway opening of the head portion is aligned with the internal passageway of the body portion;
    a moveable portion received in the opening of the head portion, wherein the moveable portion is moveable between a first position wherein a feature engages a notch of a post receivable in the internal passageway of the body portion and the passageway opening of the head portion to retain the headrest in a position, and a second position wherein the feature is disengaged from the notch of the post, allowing the post and the headrest to move relative to the bushing; and
    a resilient member located between the moveable portion and the wall of the head portion, wherein the resilient member is a coil spring, the resilient member biases the moveable portion to the first position, and manual pressure moves the moveable portion to the second position against the bias of the resilient member.

15. A bushing to allow adjustability of a position of a headrest, the bushing comprising:
a head portion having an opening and a passageway opening;
a body portion defining an internal passageway, the body portion including a collar including a flexible wall, a collar opening located above the flexible wall, a rib on a lower surface of the flexible wall, wherein the flexible wall is deformable to absorb impacts, wherein the passageway opening of the head portion is aligned with the internal passageway of the body portion; and
a moveable portion received in the opening of the head portion, wherein the moveable portion is moveable between a first position wherein a feature engages a notch of a post receivable in the internal passageway of the body portion and the passageway opening of the head portion to retain the headrest in a position, and a second position wherein the feature is disengaged from the notch of the post, allowing the post and the headrest to move relative to the bushing, and wherein the feature that engages the notch of the post is a metal piece, wherein the metal piece is molded into the moveable portion or snap fit into an opening in the moveable portion, a resilient member biases the moveable portion to the first position, manual pressure moves the moveable portion to the second position against the bias of the resilient member, and the resilient member and the metal portion are separate components.

16. A headrest assembly comprising:
a headrest;
two posts secured to the headrest, wherein at least one of the two posts includes a plurality of notches; and
a bushing to allow adjustability of a position of the headrest, the bushing including:
a head portion having an opening and a passageway opening,
a body portion defining an internal passageway, wherein the passageway opening of the head portion is aligned with the internal passageway of the body portion, the body portion including a collar including a flexible wall, a collar opening located above the flexible wall, a rib on a lower surface of the flexible wall, wherein the flexible wall is deformable to absorb impacts, wherein the flexible wall has a first width and the rib has a second width, and the first width is greater than the second width, and
a moveable portion received in the opening of the head portion, wherein the moveable portion is moveable between a first position wherein a feature engages one of the plurality of notches of the post receivable in the internal passageway of the body portion and the passageway opening of the head portion of the bushing to retain the headrest in a position, and a second position wherein the feature is disengaged from the one of the plurality of notches of the post, allowing the post and the headrest to move relative to the bushing.

17. The headrest assembly as recited in claim 16 wherein the head portion and the body portion are integral and made of molded plastic.

18. The headrest assembly as recited in claim 16 wherein the head portion includes a first side and a second side, wherein the opening is located at the first side and a wall is located near the second side.

19. The headrest assembly as recited in claim 18 including a resilient member located between the moveable portion and the wall of the head portion, wherein the resilient member is a coil spring, and the resilient member biases the moveable portion to the first position, and manual pressure moves the moveable portion to the second position against the bias of the resilient member.

20. The bushing as recited in claim 16 wherein the collar opening includes a flat surface.

21. The bushing as recited in claim 16 wherein the body portion includes a body, and the collar is located between the head portion and the body of the body portion.

22. A headrest assembly comprising:
a headrest;
two posts secured to the headrest, wherein at least one of the two posts includes a plurality of notches; and
a bushing to allow adjustability of a position of the headrest, the bushing including:
a head portion having an opening and a passageway opening,
a body portion defining an internal passageway, wherein the passageway opening of the head portion is aligned with the internal passageway of the body portion, the body portion including a collar including a flexible wall, a collar opening located above the flexible wall, a rib on a lower surface of the flexible wall, wherein the flexible wall is deformable to absorb impacts, and
a moveable portion received in the opening of the head portion, wherein the moveable portion is moveable between a first position wherein a feature engages one of the plurality of notches of the post receivable in the internal passageway of the body portion and the passageway opening of the head portion of the bushing to retain the headrest in a position, and a second position wherein the feature is disengages from the one of the plurality of notches of the post, allowing the post and the headrest to move relative to the bushing, wherein the feature that engages one of the notches of the post is a metal piece, wherein the metal piece is molded into the moveable portion or snap fit into an opening in the moveable portion.

23. A headrest assembly comprising:
a headrest;
two posts secured to the headrest, wherein at least one of the two posts includes a plurality of notches; and
a bushing to allow adjustability of a position of the headrest, the bushing including:
a head portion having an opening and a passageway opening,
a body portion defining an internal passageway, wherein the passageway opening of the head portion is aligned with the internal passageway of the body portion, the body portion including a collar including a flexible wall, a collar opening located above the flexible wall, a rib on a lower surface of the flexible wall, wherein the flexible wall is deformable to absorb impacts, wherein the collar opening has a flat bottom surface that defines an upper surface of the flexible wall and a curved top surface, and
a moveable portion received in the opening of the head portion, wherein the moveable portion is moveable between a first position wherein a feature engages one of the plurality of notches of the post receivable in the internal passageway of the body portion and the passageway opening of the head portion of the bushing to retain the headrest in a position, and a second position wherein the feature is disengages from the one of the plurality of notches of the post, allowing the post and the headrest to move relative to the bushing.

24. A headrest assembly comprising:

a headrest;

two posts secured to the headrest, wherein at least one of the two posts includes a plurality of notches; and a bushing to allow adjustability of a position of the headrest, the bushing including:

a head portion having an opening and a passageway opening, a body portion defining an internal passageway, wherein the passageway opening of the head portion is aligned with the internal passageway of the body portion, the body portion including a collar including a flexible wall, a collar opening located above the flexible wall, a rib on a lower surface of the flexible wall, wherein the flexible wall is deformable to absorb impacts, and wherein the body portion includes a wall surrounding two areas of reduced thickness on opposing sides of the body portion, a protrusion is located on an internal surface of each of the two areas of reduced thickness, a first distance is defined between the internal surfaces of the two areas of reduced thickness, a second distance is defined between the two projections, the second distance is less than the first distance, and one of the two posts with the plurality of notches is received in the internal passageway of the body portion and the passageway opening of the head portion of the bushing and has a third diameter that is greater than the second distance defined between the two projections, and a moveable portion received in the opening of the head portion, wherein the moveable portion is moveable between a first position wherein a feature engages one of the plurality of notches of the post receivable in the internal passageway of the body portion and the passageway opening of the head portion of the bushing to retain the headrest in a position, and a second position wherein the feature is disengages from the one of the plurality of notches of the post, allowing the post and the headrest to move relative to the bushing.

* * * * *

UNITED STATES PATENT AND TRADEMARK OFFICE
CERTIFICATE OF CORRECTION

PATENT NO. : 9,522,619 B2
APPLICATION NO. : 14/882729
DATED : December 20, 2016
INVENTOR(S) : Brett Ronzi and Troy Allen Isaacson Page 1 of 1

It is certified that error appears in the above-identified patent and that said Letters Patent is hereby corrected as shown below:

In the Claims

In Claim 22, Column 8, Line 33; after "wherein the feature" replace "is disengages" with --is disengaged--

In Claim 23, Column 8, Line 67; after "wherein the feature" replace "is disengages" with --is disengaged--

In Claim 24, Column 10, Line 18; after "wherein the feature" replace "is disengages" with --is disengaged--

Signed and Sealed this
Eleventh Day of September, 2018

Andrei Iancu
*Director of the United States Patent and Trademark Office*